United States Patent
Kamdar et al.

(10) Patent No.: US 10,390,276 B2
(45) Date of Patent: Aug. 20, 2019

(54) METHOD FOR TRAFFIC STEERING AND NETWORK ELEMENT

(71) Applicant: NOKIA SOLUTIONS AND NETWORKS OY, Espoo (FI)

(72) Inventors: Kashyap Kamdar, Palatine, IL (US); Brian Moore, Palatine, IL (US); Sadhana Avasarala, Bangalore (IN); Rakesh Ranjan, Bihar (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 508 days.

(21) Appl. No.: 14/649,695

(22) PCT Filed: Dec. 5, 2013

(86) PCT No.: PCT/EP2013/075600
§ 371 (c)(1),
(2) Date: Jun. 4, 2015

(87) PCT Pub. No.: WO2014/086898
PCT Pub. Date: Jun. 12, 2014

(65) Prior Publication Data
US 2016/0021588 A1 Jan. 21, 2016

Related U.S. Application Data

(60) Provisional application No. 61/733,671, filed on Dec. 5, 2012.

(51) Int. Cl.
*H04W 36/14* (2009.01)
*H04W 28/08* (2009.01)
(Continued)

(52) U.S. Cl.
CPC .......... *H04W 36/14* (2013.01); *H04W 28/08* (2013.01); *H04W 36/22* (2013.01); *H04W 36/38* (2013.01); *H04W 88/06* (2013.01)

(58) Field of Classification Search
None
See application file for complete search history.

(56) References Cited

U.S. PATENT DOCUMENTS

| | | |
|---|---|---|
| 2007/0280161 A1 | 12/2007 | Rudrapatna et al. |
| 2008/0189360 A1 | 8/2008 | Kiley et al. |

(Continued)

FOREIGN PATENT DOCUMENTS

| | | |
|---|---|---|
| CN | 1582054 A | 2/2005 |
| CN | 1820452 A | 8/2006 |

(Continued)

OTHER PUBLICATIONS

International Search Report and Written Opinion dated Mar. 31, 2014 corresponding to International Patent Application No. PCT/EP2013/075600.

(Continued)

*Primary Examiner* — Duc T Duong
(74) *Attorney, Agent, or Firm* — Squire Patton Boggs (US) LLP

(57) ABSTRACT

The present invention relates a method for traffic steering in a communication network comprising at least two technology layers. The method comprising utilizing one or more policies for traffic steering, selecting one or more users in a first technology layer according to the selected policies and preparing a movement of one or more selected users to a second technology layer. Moreover, the present invention relates to an apparatus and computer program product.

13 Claims, 23 Drawing Sheets

(51) Int. Cl.
*H04W 36/22* (2009.01)
*H04W 36/38* (2009.01)
*H04W 88/06* (2009.01)

(56) References Cited

U.S. PATENT DOCUMENTS

| | | | |
|---|---|---|---|
| 2013/0029708 A1* | 1/2013 | Fox | H04W 28/08 455/509 |
| 2013/0288690 A1* | 10/2013 | Chou | H04W 24/06 455/446 |
| 2014/0038606 A1* | 2/2014 | Jang | H04W 36/22 455/436 |
| 2015/0011182 A1* | 1/2015 | Goldner | H04M 15/66 455/406 |
| 2015/0271827 A1* | 9/2015 | Hamalainen | H04W 76/04 455/452.2 |
| 2015/0282058 A1* | 10/2015 | Forssell | H04W 48/18 455/552.1 |
| 2015/0327137 A1* | 11/2015 | Zhang | H04W 48/18 370/331 |
| 2016/0183281 A1* | 6/2016 | Yeh | H04W 28/24 370/332 |

FOREIGN PATENT DOCUMENTS

| | | |
|---|---|---|
| CN | 101835201 A | 9/2010 |
| CN | 102437965 A | 5/2012 |
| EP | 2 112 858 A1 | 10/2009 |
| EP | 2408232 A1 | 1/2012 |
| WO | WO 2009/149600 A1 | 12/2009 |
| WO | WO 2012/142437 A1 | 10/2012 |
| WO | 2012149954 A1 | 11/2012 |

OTHER PUBLICATIONS

NEC, "Intra-LTE (interfrequency) and inter-RAT cell reselection," 3GPP Draft; R2-071494—3GPP TSG-RAN2 #57bis, Mar. 26-30, 2007, St. Julian's, Malta, retrieved on Mar. 22, 2007, XP050134428, 5 pages.
T-Mobile, "Load Sharing Using Cell Reselection," 3GPP Draft; R2-061238, 3GPP TSG RAN WG2#53, Shanghai, China, May 8-12, 2006, retrieved on May 3, 2006, XP050131184, 6 pages.
European Office Action dated Jan. 19, 2018, issued in corresponding EP Application No. 13814462.1.
Chinese Office Action dated Jan. 22, 2018, issued in corresponding CN Application No. 201380072309.5.
European Office Action issued in corresponding European Patent Application No. 13 814 462.1-1214 dated Aug. 27, 2018.
Chinese Office Action application No. 201380072309.5 dated Nov. 1, 2018.
Chinese Office Action issued in corresponding Chinese Patent Application No. 201380072309.5 dated Jun. 3, 2019.

\* cited by examiner

| RAT | User throughput (in mbps) | | Cell throughput (in mbps) | | | |
|---|---|---|---|---|---|---|
| | Average DL | Average UL | Average DL | Average UL | Max DL | Max UL |
| UMTS 5mHz(HSPA, HSUPA) | 1.25 | 0.375 | 5 | 1.5 | 6.5 | 1.95 |
| LTE 10mHz Urbun | 4 | 2.25 | 16 | 9 | 20.8 | 11.7 |

Average user throughput
= Average Cell tput/4
Since there are 4 User in each RAT Published numbers 100% load
= Average + 30% of average

Fig. 5

| Policy Attributes for Load Distribution | Description |
| --- | --- |
| UMTS Max Downlink Bit Rate (mbps) = 6.5 | 100% load on downlink for UMTS |
| UMTS Max Uplink Bit Rate (mbps) = 1.95 | 100% load on uplink for UMTS |
| LTE Max Downlink Bit Rate (mbps) = 20.8 | 100% load on downlink for LTE |
| LTE Max UpLink Bit Rate (mbps) = 11.7 | 100% load on uplink for LTE |
| Pre-congestion threshold (%) = 90 | Trigger point for IoTS is at 90% load |
| Target LTE Load Quota (%) = 50 | Quota for each RAT to distribute / balance the load |
| Target UMTS Load Quota (%) = 50 | |
| Load Delta Threshold (%) = 20 | Minimal delta in load required to trigger load balancing |

Fig. 6

| sCell | tRAT | tCells |
|---|---|---|
| A | LTE2 | L,M,N |
| A | UMTS1 | X,Y,Z |
| B | LTE2 | M |
| B | UMTS1 | Y |
| C | LTE2 | N |
| C | UMTS1 | Z |
| L | LTE1 | A |
| L | UMTS1 | X,Z |
| M | LTE1 | A,B |
| M | UMTS1 | Y,Z |
| N | LTE1 | A,C |
| N | UMTS1 | Z |

Fig. 12

| Policy | Attribute | Value |
|---|---|---|
| Load Distribution | Target LTE Load Quota | 50% |
| Load Distribution | Target UMTS Load Quota | 50% |
| Load Distribution | Load Delta Threshold | 20% |
| Load Distribution | UMTS Max Downlink Bit Rate | 4000 |
| Load Distribution | UMTS Max Uplink Bit Rate | 1000 |
| Load Distribution | LTE Max Downlink Bit Rate | 15000 |
| Load Distribution | LTE Max DownLink Bit Rate | 5000 |

Fig. 15

| Pre-Condition Trigger | Condition Trigger | Load Distribution Weight | Subscriber Prioritization Weight | Application Mapping Weight | Session Characterization Weight |
|---|---|---|---|---|---|
| LTE Load >=90% | LTE Load – UMTS Load >= 10% | 5 | 3 | 2 | 0 |
| LTE Load >=80% | LTE Load – UMTS Load >= 20% | 3 | 4 | 1 | 2 |
| LTE Load >=70% | LTE Load – UMTS Load >= 20% | 2 | 5 | 2 | 1 |
| LTE Load <=60% | LTE Load – UMTS Load >= 20% | 0 | 3 | 4 | 3 |
| UMTS Load >=90% | UMTS Load – LTE Load >= 10% | 5 | 3 | 2 | 0 |
| UMTS Load >=80% | UMTS Load – LYE Load >= 20% | 3 | 4 | 1 | 2 |
| UMTS Load >=70% | UMTS Load – LTE Load >= 20% | 2 | 5 | 2 | 1 |
| UMTS Load <=60% | LTE Load – UMTS Load >= 20% | 0 | 3 | 4 | 3 |

Fig. 16

| Subscriber Category | GSM1 | UMTS1 | LTE1 | WiFi |
|---|---|---|---|---|
| TSES QoS Differentiation | 5 | 7 | 9 | 1 |
| TSES App Profit | 5 | 7 | 9 | 1 |
| TSES Service Profit | 5 | 7 | 9 | 1 |
| TSES Sponsored | 5 | 7 | 9 | 1 |
| Roamer | 8 | 8 | 5 | 3 |
| Prepay | 5 | 6 | 7 | 3 |
| CoS Gold | 4 | 6 | 8 | 2 |
| CoS Silver | 4 | 8 | 6 | 2 |
| CoS Bronze | 8 | 6 | 4 | 2 |

Fig. 17

| Session Category | GSM1 | UMTS1 | LTE1 | WIFI |
|---|---|---|---|---|
| Voice | 4-Best | 2-Good | 2-Good | 1-Bad |
| Texting | 3-Better | 3-Better | 2-Good | 4-Best |
| Web Browsing | 2-Good | 4-Best | 3-Better | 4-Best |
| Video | 1-Bad | 2-Good | 4-Best | 3-Better |

The higher the number the more that the RAT/Frequency is preferred. In the implementation, the number is only provided and used. This example includes a short word to describe the preference and is considered just a comment. The range can be larger than 1 – 4, and if desired can include both zero and negative numbers. The numbers need not be unique across either a row or a column.

Fig. 18

| sRAT | sRAT Duration Trigger (sec) | Session Duration > sRAT Duration | Session Category |
|---|---|---|---|
| X | 0 | Yes | High Velocity |
| X | 0 | No | Unknown |
| GSM1 | >120 | X | Low Velocity |
| UMTS1 | >90 | X | Low Velocity |
| LTE1 | >90 | X | Low Velocity |
| WiFi | >15 | X | Low Velocity |
| GSM1 | >480 | No | Stationary |
| UMTS1 | >360 | No | Stationary |
| LTE1 | >300 | No | Stationary |
| WiFi | >300 | No | Stationary |
| X | >600 | X | Stationary |

Fig. 19

| Session Category | GSM1 | UMTS1 | LTE1 | WiFi |
|---|---|---|---|---|
| High Velocity | 4 | 3 | 2 | 1 |
| Low Velocity | 2 | 3 | 4 | 1 |
| Stationary | 1 | 2 | 3 | 4 |
| Unknown | 1 | 1 | 1 | 1 |

Fig. 20

| Subscribers | Geography | Network Optimization | Overlay Network Architecture | Network Impact |
|---|---|---|---|---|
| • Concentrated on Individual User (IMSI) – Available only when in the RRC Connected Mode<br>• Group of Users - Service Class - All Users | • Concentrated on Cell – known with UE is RRC Connected<br>• Paging Area - UMTS Routing Area (RA) & Location Area (LA), LTE Tracking Area (TA)<br>• Network Elements (MME, RNC, etc.)<br>• Network | • Concentrated on Observed Cell Throughput<br>• Radio Resources, Backhaul, Transport and Core Network Resources | • Concentrate on One-One Cell Overlay<br>• One-Many and Many-Many Cell Overlay Networks | • Concentrated on effecting Individual Subscribers within a single cell via a Candidate List<br>• Groups of subscribers perhaps by category |

Fig. 21

METHOD FOR TRAFFIC STEERING AND NETWORK ELEMENT

TECHNICAL FIELD

Embodiments of the present invention relate generally to mobile communications and more particularly to network elements and methods in communication networks. The present invention relates to a method for traffic steering and to network elements and to a computer program product and to a computer readable medium. In particular, the method suggested may be a method of insight traffic steering.

BACKGROUND

This section is intended to provide a background or context to the invention disclosed below. The description herein may include concepts that could be pursued, but are not necessarily ones that have been previously conceived, implemented or described. Therefore unless otherwise explicitly indicated herein, what is described in this section is not prior art to the description in this application and is not admitted to be prior art by inclusion in this section.

Abbreviations that may be found in the specification and/or the drawing figures are defined at the end of the text of this specification.

Legacy and 3G networks are optimized in a traditional approach by NOCs and field technicians, e.g. by analyzing KPIs and alarms. Profitability for operators of cellular networks, including the legacy, 3G and 4G networks, is being challenged with an exponential increase in network elements (NEs).

1) Rapid expansion of 3G networks to handle increase in data services makes traditional optimization approach costly.

2) Introduction of 4G networks that must co-exist with 3G/2.5G for some time

3) Advent of Heterogeneous networks will significantly increase in number of network elements (NE).

Consequently, the traditional approaches for network optimization need improvement.

SUMMARY OF THE INVENTION

This section contains examples of possible implementations and is not meant to be limiting.

According to an exemplary embodiment of the present invention a method for traffic steering in a communication network comprising at least two technology layers may be provided. The method may include utilizing one or more policies for traffic steering for at least one user in the communication network, selecting one or more users in a first technology layer according to the selected policies and preparing a movement of one or more selected users to a second technology layer. In particular, the method suggested may be a method of insight traffic steering.

There may be provided a method for traffic steering within network elements of a wireless cellular mobile communications network. In this content the terms, such as terminal, user equipment (UE), subscriber, customer and candidate may be utilized in an exchangeable way and may include a user utilizing one or more services within a telecommunication network. In the case the user should be moved from one technology layer to another technology layer according to the suggested traffic steering mechanisms the expression candidate is used in this context. In case there is more than one user chosen, the expression candidate list describes the collection of chosen users.

A technology layer may be understood in this context as RATs (Radio Access Technologies) or frequency bands of different technologies, such as GSM, UMTS, LTE, WiFi, etc.

Traffic steering may be understood in this context as a mechanism that allows steering traffic efficiently between multiple radio access technologies and frequency bands for a flexible utilization of network assets. A motivation for traffic steering may be a load distribution, a better experience for a user and the profitability for an operator.

Traffic steering in communication networks may allow steering the traffic efficiently between the multiple radio access technologies for a flexible utilization of the network assets. There may be a motivation for improve load distribution, better experience for a user and profitability from the viewpoint of an operator.

Due to the rollout of the network, technology evolution and frequency allocation, a single wireless cellular network operator may provide service over multiple Radio Access Technologies (RATs) consisting of technologies such as 2G, 3G, 4G, and WiFi (GSM, CDMA, LTE, etc.) and multiple frequency bands (carriers) that may be configured using diverse network topologies. Under certain load conditions, the network may not be optimally utilized, which may result in blocked service or lower Quality of Experience (QoE) providing a less than optimal customer experience.

The suggested method aims in automatically monitoring the network status across multiple RATs and the customer activity to determine if there is a need to redirect traffic to avoid congestion, improve network resource utilization, or improve the customer's QoE. Moreover, the traffic across the multiple RATs and frequencies may be automatically steered. There may be automatically provided a list of subscribers to steer across multiple RATs/frequencies, to the appropriate network component, such as HSS/ANDSF/SON server/etc.

The suggested method may support the simultaneous execution of multiple traffic steering policies. These policies may include load distribution, subscriber prioritization, application mapping, and session characterization. In the following the different policies are more explained:

The load distribution policy may spread the load evenly across multiple RATs to optimize response time and minimize interference for improved QoE. The subscriber's present throughput/usage as well as the cell/network load for uplink and downlink may be used to choose the optimal RAT to provide most efficient network resource utilization and provide the best possible customer QoE under the current load.

For the subscriber prioritization policy, the use of subscriber ranking/importance may ensure that the most optimal network is used for the most important subscribers. The subscriber prioritization policy may ensure higher priority class users get desired QoE across all QoS and captures the best available QoE for regular user. The subscriber's importance may be determined to be the highest paid or most profitable customers via the user's service class, payment method, roamer status, and/or has currently an enhanced service subscriber.

The application mapping policy may ensure applications use the appropriate RAT as defined by network operator for the service (e.g. Voice/Text on UMTS, Video/P2P/FTP on LTE). The current and trend based application usage for a given subscriber and an application-to-RAT mapping table may be used to choose the optimal RAT to serve a particular application to provide optimal application experience.

The session characterization policy may ensure subscribers are on the appropriate RAT as defined by network operator based on session characteristics. The use of UE's session duration and cell duration may be used to categorize (current/trend based) user's mobility. A session-to-RAT mapping table is then used to choose optimal RAT to serve a particular session to provide optimal and un-interrupted experience.

In summary, the suggested method may support the ability to prioritize the traffic steering policies execution and results under a range of network conditions (e.g. heavy to light load levels). The current network condition and customer activity may be used to define the level of emphasis placed on each of the traffic steering policies as configured by the network operator to customize steer traffic results for the current network condition. The suggested method may consolidate the weighted results of all the policies to provide a prioritized measured traffic steering response to be consumed by network.

There may be provided a mechanism that enables intelligent and full automated traffic steering that may utilize CEM insights to trigger and drive traffic steering candidate selection and target selection using policies from an operator in following areas. These policies may be: Load Distribution, Subscriber Prioritization, Application Mapping and/or Session Characterization. The suggested method may be executed by employing these polices to generate one or more candidates lists or users lists. This may be performed for example in a near real-time mode. Moreover, the mechanism may provide this candidate list, comprising information about the cell, the user and the target to the network and may monitor for a change or lack of change to take further actions.

In other words there may be provided a method for insight based traffic steering candidate selection in wireless communication network comprising multiple, meaning two or more, RATs/Frequency bands. It may be foreseen utilizing multiple simultaneous and independent policies to generate a traffic steering candidate selection, including but not limited to load distribution, subscriber prioritization, application mapping and session characterization policies. The policies may be applied simultaneous and concurrent, but could also be applied as a single policy or a combination of two policies or three policies. Moreover, it may be foreseen utilizing scalable weighted merge of independently prepared traffic steering candidate lists from above mentioned policies to prepare a final traffic steering candidate list. Moreover, it may be foreseen utilizing network load as a trigger to start and/or to stop traffic steering candidate list generation. There may be several solutions how the generation of the traffic steering candidate list may be generated. It may be generated on a periodic basis. This periodic basis may be a real-time, near-realtime, online or offline basis.

Moreover, it may be foreseen that the generated list comprising users and a respective target RAT/frequency-layer is then provided to elements in the wireless network to implement steering of traffic.

For all traffic steering policies there may be provided independent consideration of uplink and downlink traffic load as well as calculation of Target RAT region load based on the overlaying target RAT Cell loads or on averaging loads of overlaying cells of target RAT.

For the traffic steering load distribution policy, the use of a present throughput/usage of a certain UE as well as the cell/network load may be utilized.

For the traffic steering subscriber prioritization policy, the use of subscriber ranking and/or subscriber importance may be utilized to ensure the most optimal network is used for the most important subscribers. The subscriber's importance may be determined to be the highest paid or most profitable customers via the users service class, payment method, roamer status, and/or is currently an enhanced service subscriber.

For the traffic steering application mapping policy, it may be identified a current or trend based application usage for a given subscriber and it may be utilized an application-to-RAT mapping, maybe preconfigured, table to choose the most optimal available RAT to serve a particular application to provide optimal application experience.

For traffic steering session characterization policy, the use of a session duration of a UE and cell duration may be utilized to categorize a current or trend based mobility of a user and a session-to-RAT mapping, maybe preconfigured, table may be utilized to choose optimal RAT to serve a particular session to provide optimal and un-interrupted experience.

It may be foreseen to use a configurable scalable weight to emphasize different traffic steering policies under different network conditions. This weighted approach may impact the candidate selection for the current network condition.

A configurable weighed scale may be provided to define network UE's preference within policies, such as subscriber prioritization, application mapping and session characterization.

The use of policy thresholds to constrain the number of simultaneous traffic steering requests from various policies may be provided to avoid an oscillation or an ping-ponging effect of traffic.

Moreover, it may be provided normalizing several traffic steering actions for multiple traffic steering policies to impact a specific set of UEs in terms of candidate list indicating specific UEs to be directed from a source CID to a target RAT and submitting it to the correct network element such as policy servers (ANDSF, HSS, etc.) and/or network management system (NMS, EMS, SON, etc.). With other words normalization may be provided in order to provide a list to several networks, wherein node in these networks may perform different action after having received the list.

According to an exemplary embodiment of the present invention there may be provided an apparatus, comprising one or more processors; and one or more memories including computer program code. The one or more memories and the computer program code may be configured, with the one or more processors, to cause the apparatus to perform utilizing one or more policies for traffic steering, selecting one or more users in a first technology layer according to the selected policies and preparing a movement of one or more selected users to a second technology layer.

As mentioned above the terms "user" and "candidate" may be used in this context in an exchangeable way. The same relates to the expressions user list and candidate list.

The apparatus may be a network element, such as a traffic steering element or a server, such as a HSS server or a policy server. The traffic steering element or the policy server may comprise a table with policy attributes and/or a stored policy for traffic steering. Furthermore the network element or the server for traffic steering may be installed in the core network of a telecommunication network.

Moreover, the apparatus may be a terminal, such as a mobile phone or a tablet, for example a tablet computer device. In case the apparatus is a network element, installed in a telecommunication network, then the terminal may be provided with interfaces in order to communicate with one or more of the suggested network elements collecting information from the terminal for preparing a steering mechanism, performed by the network element.

Moreover, according to an exemplary embodiment of the present invention there may be provided a computer program product comprising a computer-readable storage medium bearing computer program code embodied therein for use with an apparatus, wherein the computer program code comprises code for executing the suggested mechanism for traffic steering.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium (e.g., memories or other device) that may be any media or means that can contain or store the instructions for use by or in connection with an instruction execution system, apparatus, or device, such as a computer.

BRIEF DESCRIPTION OF THE DRAWINGS

In the drawing figures exemplary embodiments in relation to the present invention are illustrated. In the attached drawing figures:

FIG. 5 illustrates an exemplary model for utilizing the different policies of FIG. 4;

FIG. 6 illustrates a further exemplary model for utilizing the different policies of FIG. 4;

FIG. 12 illustrates a table with one column of the scanned cell of a matrix, one column of a target RAT (tRAT) and one column of one or more target cells (tcells) within the target RAT;

FIG. 15 illustrates an exemplary embodiment of a table which represent parameters for providing to the network in order to prepare traffic steering;

FIG. 16 illustrates an exemplary embodiment of a table which represent parameters for providing to the network in order to prepare traffic steering;

FIG. 17 illustrates an exemplary embodiment of a table which represent parameters for providing to the network in order to prepare traffic steering;

FIG. 18 illustrates an exemplary embodiment of a table which represent parameters for providing to the network in order to prepare traffic steering;

FIG. 19 illustrates an exemplary embodiment of a table which represent parameters for providing to the network in order to prepare traffic steering;

FIG. 20 illustrates an exemplary embodiment of a table which represent parameters for providing to the network in order to prepare traffic steering;

FIG. 21 exemplary triggers to move a user form one technology layer to another technology layer;

DETAILED DESCRIPTION OF THE DRAWINGS

Figure 1:
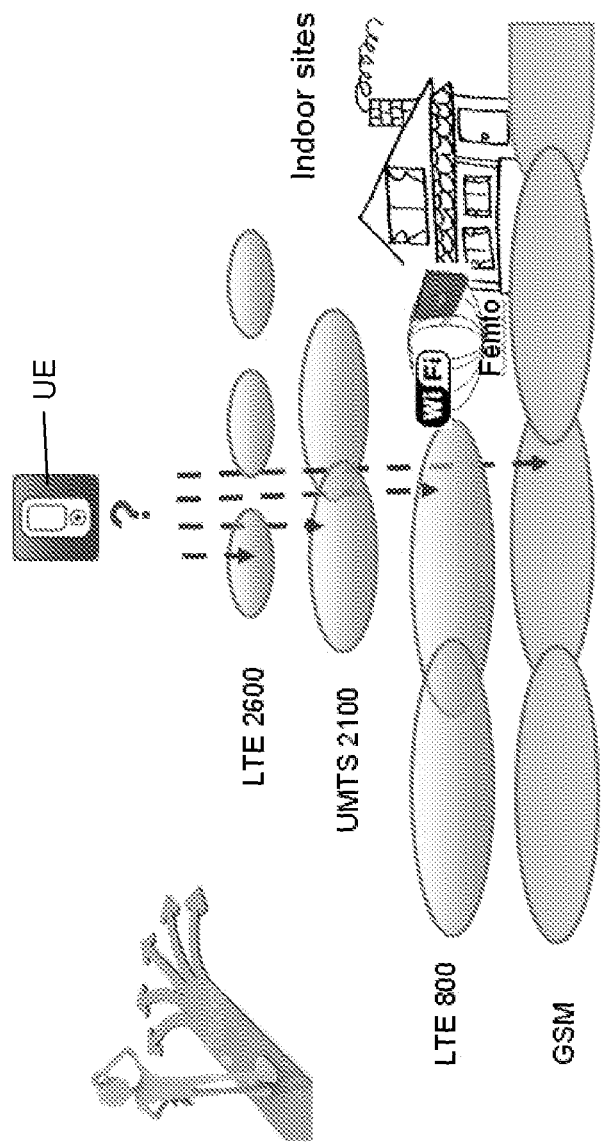
FIG. 1 illustrates different radio access technology and frequency band layers.

FIG. 1 illustrates different radio access technology and frequency band layers which may exist in parallel within one network. These technology layers may comprise GSM, LTE, UMTS. In addition there may exist WiFi connection of a femto cell within the same network. A terminal which is connected to the network may be connected to one of these layers dependent on the service requested by the terminal.

Figure 2:
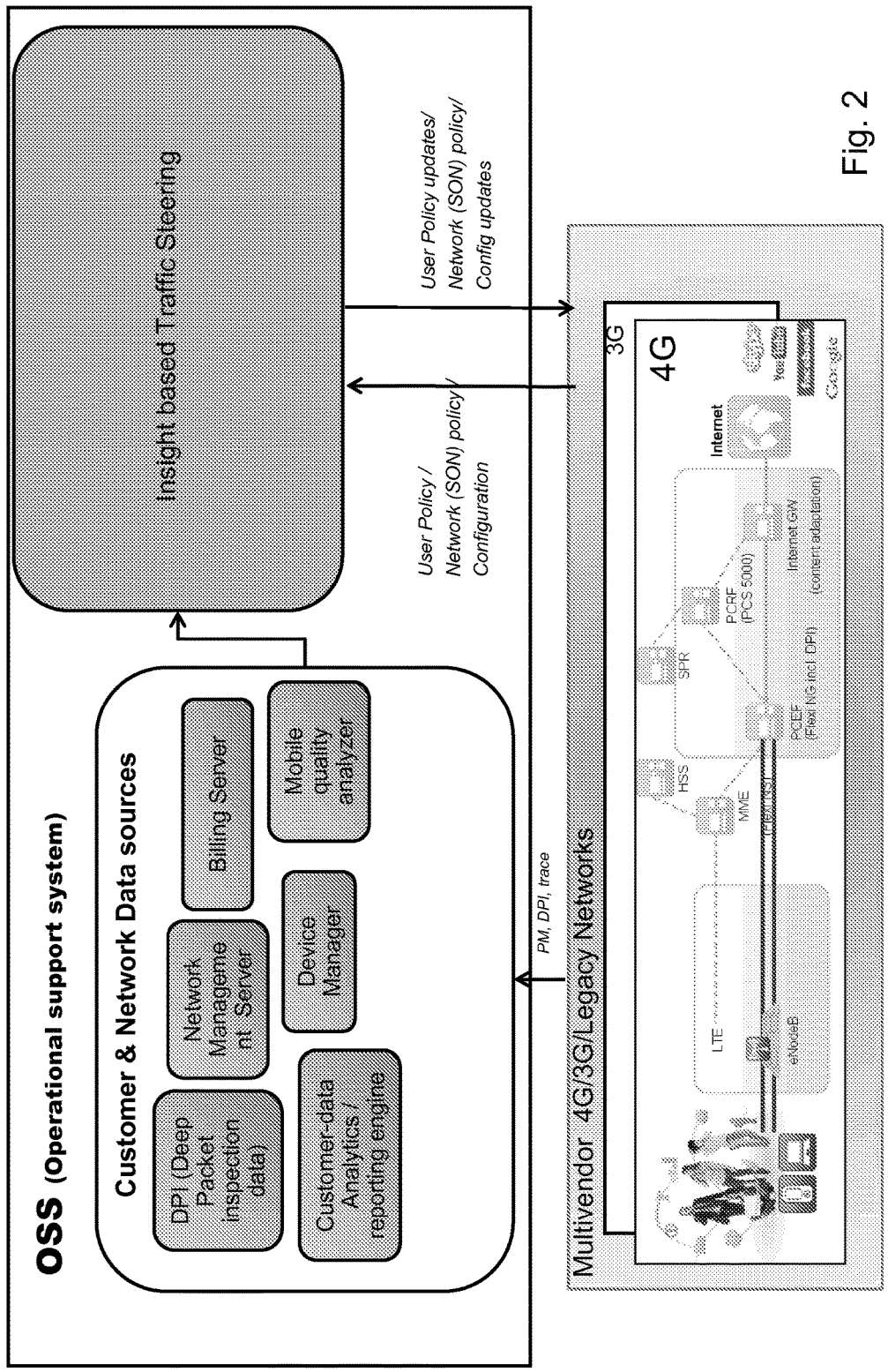
FIG. 2 illustrates an exemplary embodiment of a network architecture in accordance of the instant invention.

FIG. 2 illustrates an Operational Support System (OSS) comprising customer and network data sources, which may have an access to a network element which offers a mechanism of traffic steering, which mechanism may also be called insight based traffic steering. The network element may interact with multivendor 4G/3G/Legacy Networks. Between the network element and the networks there may be take place an exchange of user policy, network (SON) policy and/or configuration updates. The customer and network data sources may include deep packet inspection (DPI) data, a network management server, a billing server, a customer data analytics and reporting engine, a device manager and a mobile quality analyzer. It may be understood that these sources are not limited and may be combined in a suitable way with one or more to each other.

Figure 3:
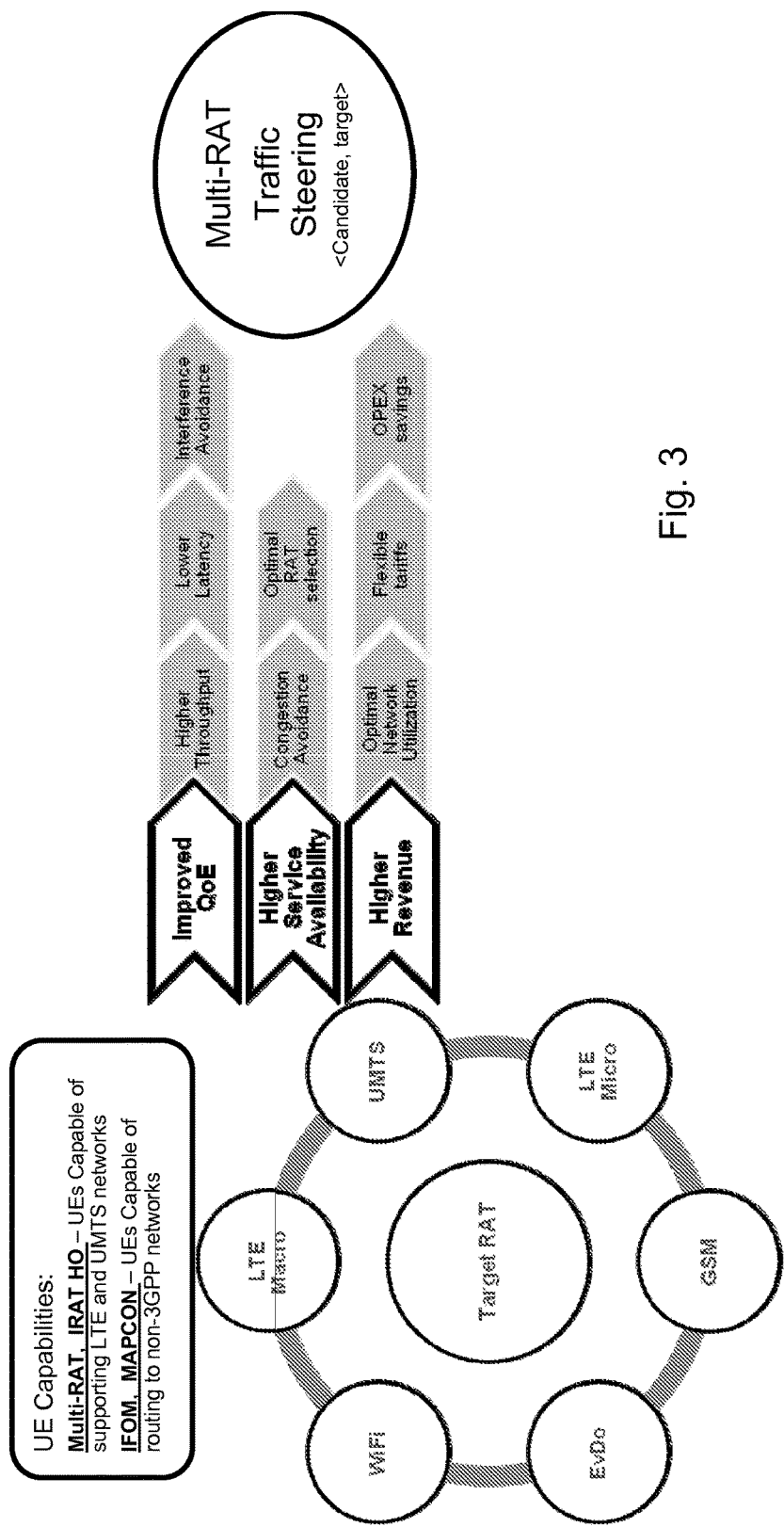
FIG. 3 illustrates an exemplary embodiment for a traffic steering mechanism.

FIG. 3 illustrates an exemplary embodiment of a network architecture in accordance with the instant invention. Multivendor networks may include 4G networks and 3G networks and may include legacy networks. The illustrative 4G network is in communication with two UEs. The radio network portion includes an eNodeB. The core portion in this example includes a PCEF (Policy and Charging Enforcement Function) (e.g., a Flexi network gateway, NG, from NSN, including DPI), a PCRF (Policy and Charging Rule Function) (e.g., a PCS, policy control server, 5000 from NSN), and an Internet gateway (GW) (e.g., including content adaptation). The 4G network may also include an MME (Mobility Management Unit), an HSS (Home Subscriber Server), and an SPR (Subscription Profile Repository). The networks communicate with the insight based traffic steering element using one or more links between the networks and the insight based traffic steering element. In these links user policy information, network policy information, configuration information and update information may be communicated.

The OSS may include a number of customer and network data sources. In this example, CEM would be part of OSS. Shown in this example are the following customer and network data sources: DPI data; one or more network management servers; one or more billing servers; a customer-data analytics/reporting engine; a device manager; and a mobile quality analyzer. Any data from the customer and network data sources may be communicated to or accessed by the insight based traffic steering element using one or more connections. The interface for a link may be used to ingest data from various CEM components. The interface can be used for transferring information in files (e.g., xml, extensible markup language, files), or messages over an IP socket. The insight traffic steering element may be a network element, such as a server, for example a centralized SON server, which may collect information in order to provide traffic steering mechanism after an evaluation has been performed. The evaluation may be performed by the insight based traffic steering network element of FIG. 2 or may be provided by a different network element connected with the insight based traffic steering network element of FIG. 2.

FIG. 3 illustrates how exemplary embodiments of the present suggested mechanism may aim in a traffic steering by considering improved QoE, higher service availability and higher revenue of a target RAT, which may comprise several layer technologies, such as UMTS, LTE micro, LTE macro, EvDo, etc.

Figure 4:
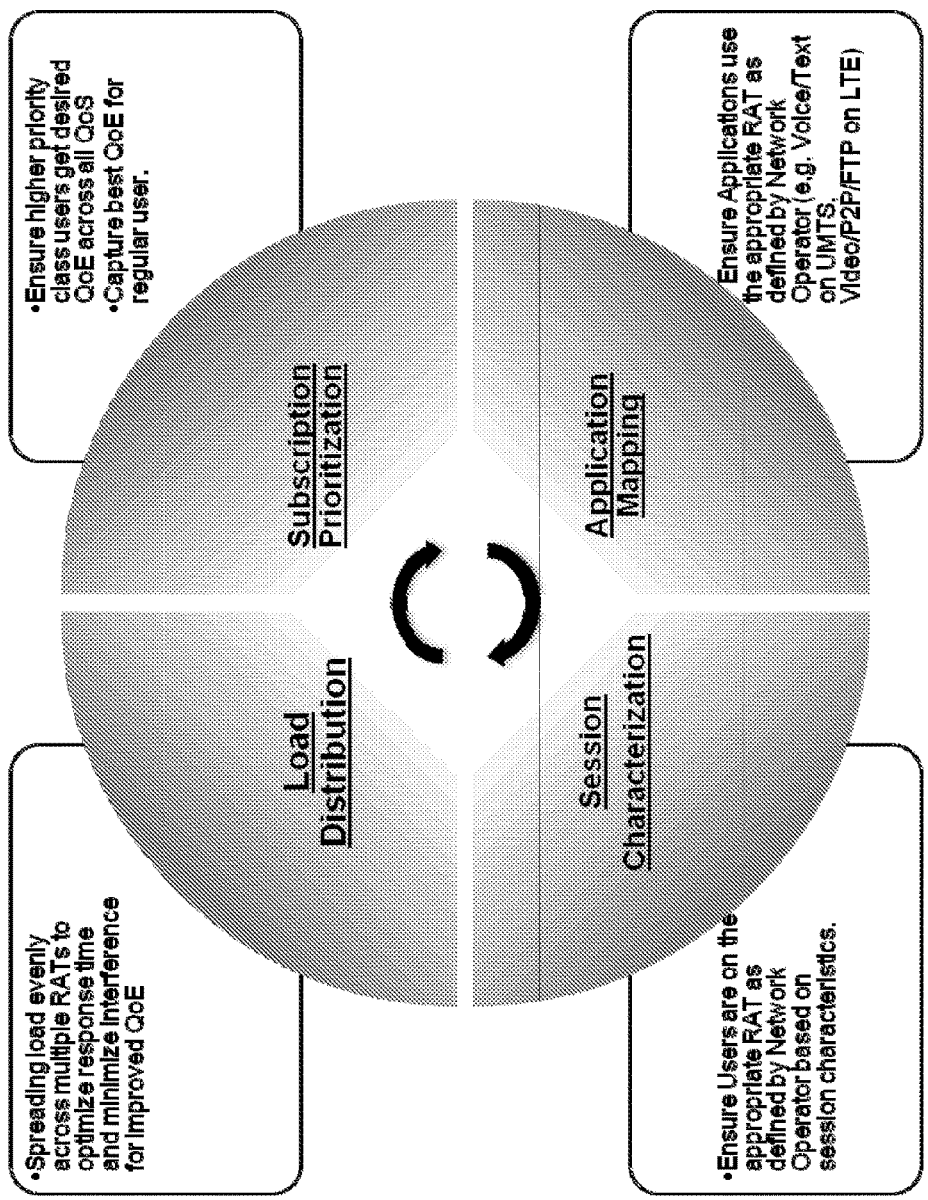
FIG. 4 illustrates an exemplary session characterization policy.

FIG. 4 illustrates different policies, which may be utilized separately or in combination with one or more policy together.

One policy in FIG. 4 is a load distribution policy, which may include spreading load evenly across multiple RATs in order to optimize a response time and in order to minimize interference for improved QoE.

Another policy in FIG. 4 is a subscription prioritization policy, which may ensure higher priority class users which may get a desired QoE across all QoS. Moreover, the policy may capture the best available QoE for a regular user.

In FIG. 4 a further policy is an application mapping policy, which may ensure that applications may use the appropriate RAT as defined by a network operator, for example voice applications and text applications on UMTS radio access technology layer and applications such as video, P2P, FTP on LTE radio access technology layer.

A further policy in FIG. 4 is a session characterization policy. This policy may ensure that users are on the appropriate RAT as defined by the network operator based on session characteristics. For example a long session, such as a movie streaming may be not disturbed whereas a short session such as a voice call may be moved into another technology layer.

In summary FIG. 4 illustrates four policies, which are related to load distribution, subscriber prioritization, application mapping and session characterization. These policies can be independently used, or in combination, or a weighted merge of the candidate list from different policies can also be performed to derive a final candidate list for a given logical group of cells or users. All policies may be utilized in order to dynamically move users from one technology layer to another technology layer within a communication network.

In relation to the different policies there may be different inputs and targets, which are listed as exemplary embodiments as follows:
Load distribution policy
Inputs (raw/insights): Source and target RAT loads, Users, etc.
Attributes:
Start and stop trigger (Load levels, etc)
Target: Distribution ratio target
Subscriber prioritization policy
Inputs (raw/insights): Suffering CEIs, Sub type
Attributes:
Start and stop trigger (CEI drops, etc)
Target: Offered QoE level
Application mapping policy
Inputs (raw/insights): QCI type/APN type/CDN-or-end point type
Attributes:
Start and stop trigger (Application specific load levels, source specific load level, etc)
Target-2-application priority mapping
Session characterization policy
Inputs (raw/insights): Number of sessions, session duration, Application type=Navigation, etc
Attributes:
Start and stop trigger (Duration based, Session type)
Target-2-mobility mapping FIG. 5 and FIG. 6 illustrate an exemplary model for utilizing the different policies of FIG. 4. These configuration table sets limits and threshold used by the suggested mechanism to monitor the network capabilities and capacities and forecast the affect that traffic steering will have on the network.

Figure 7:
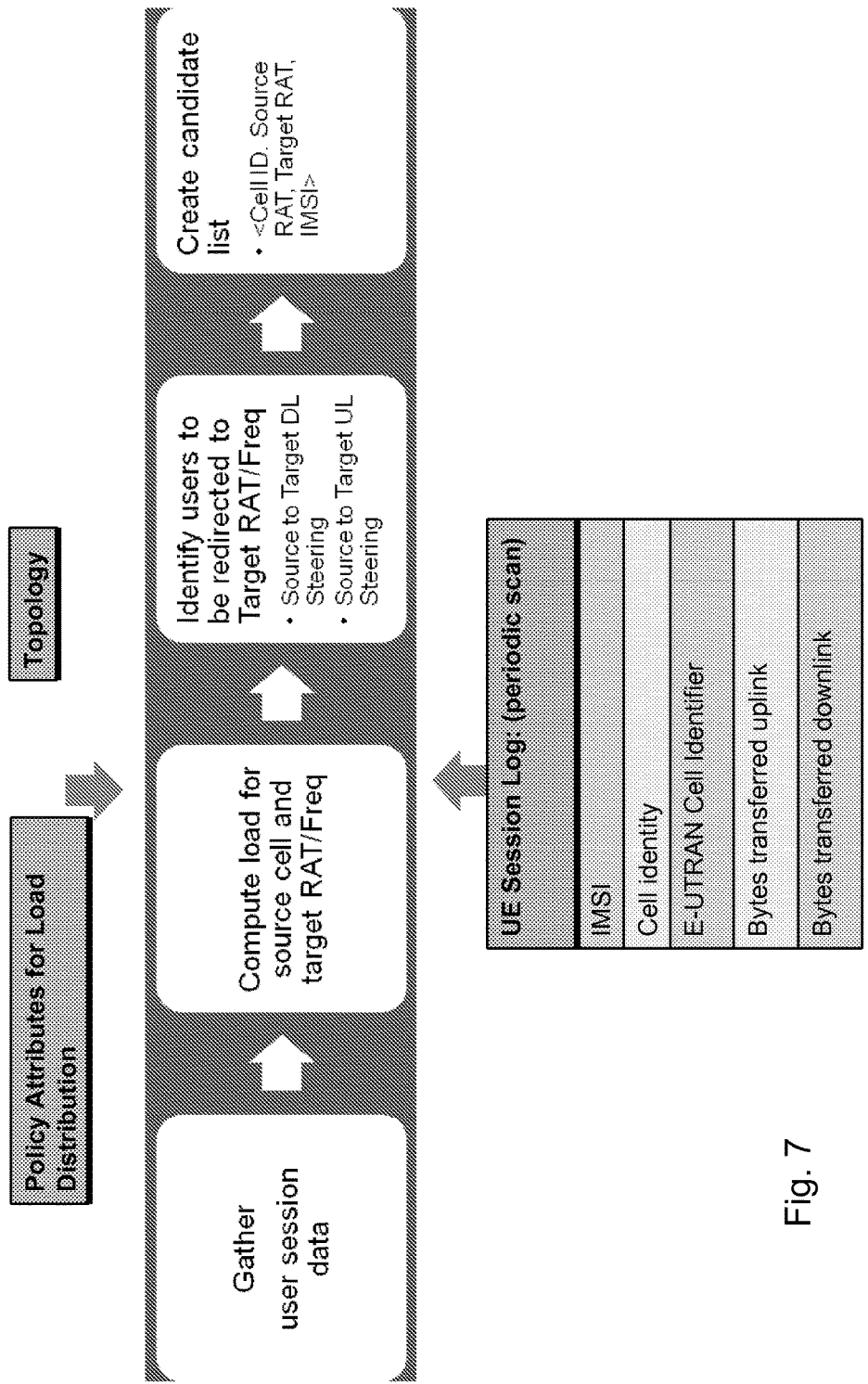
FIG. 7 illustrates an applied policy of FIG. 4 in more details.
Figure 8:
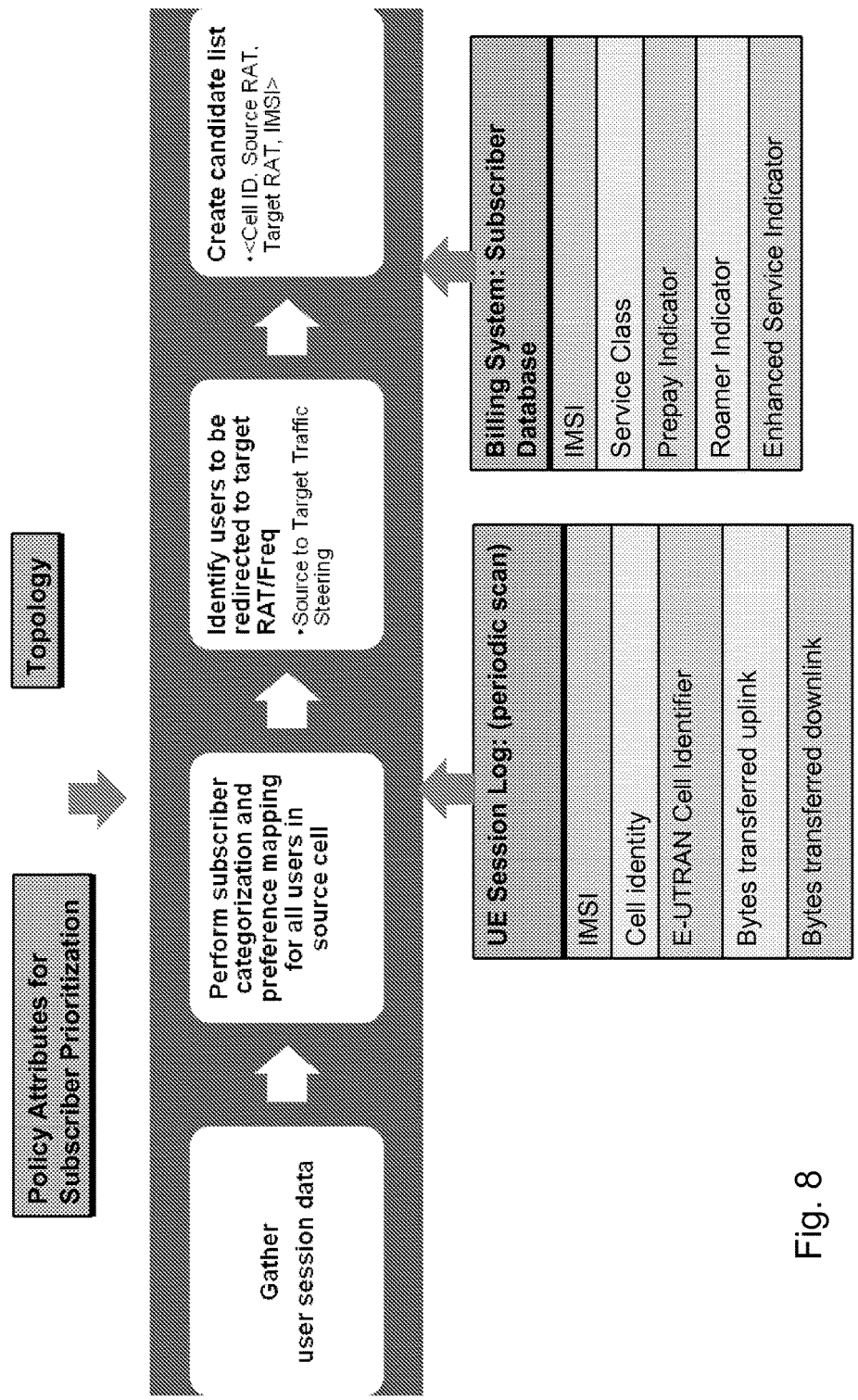
FIG. 8 illustrates an applied policy of FIG. 4 in more details.
Figure 9:
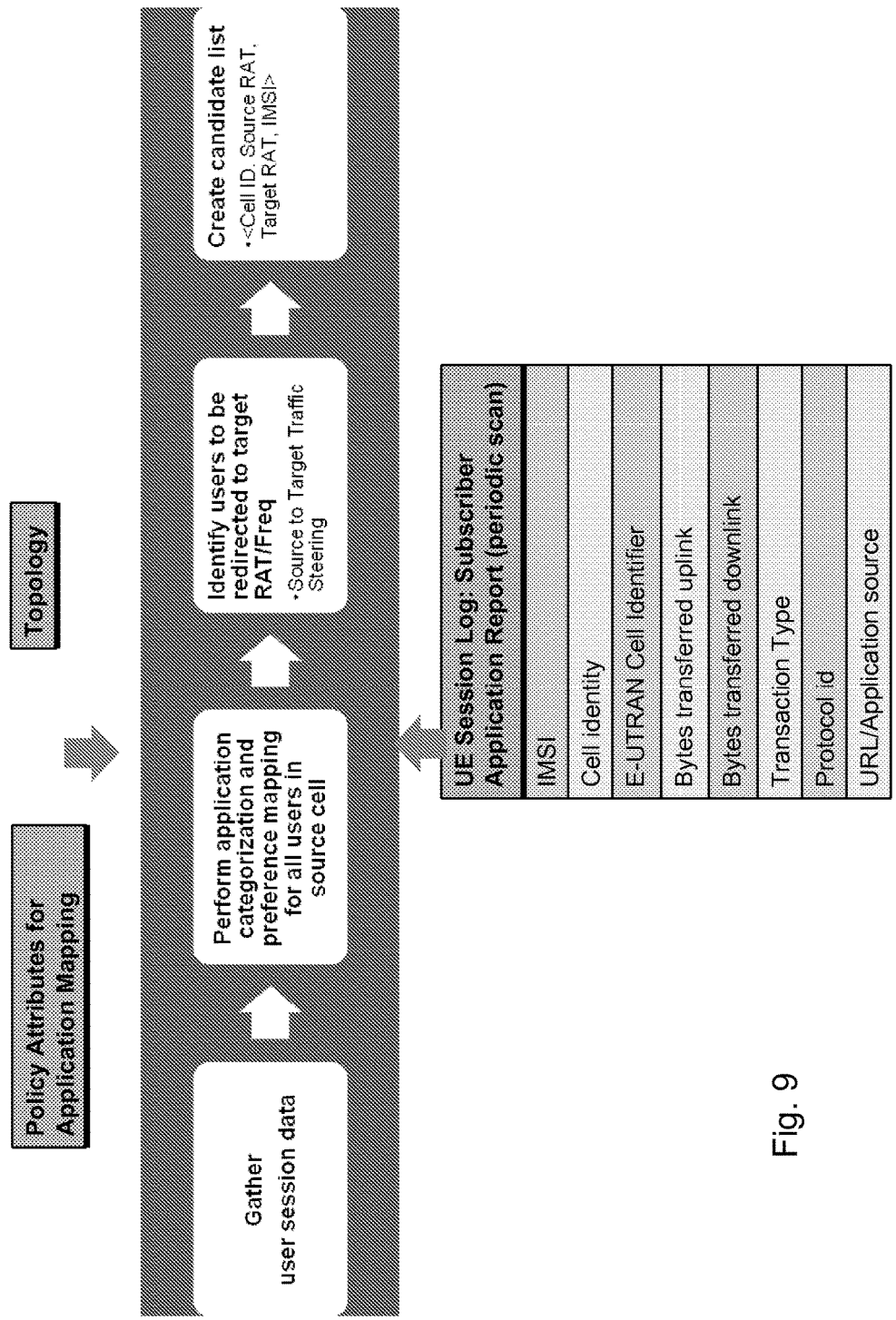
FIG. 9 illustrates an applied policy of FIG. 4 in more details.
Figure 10:
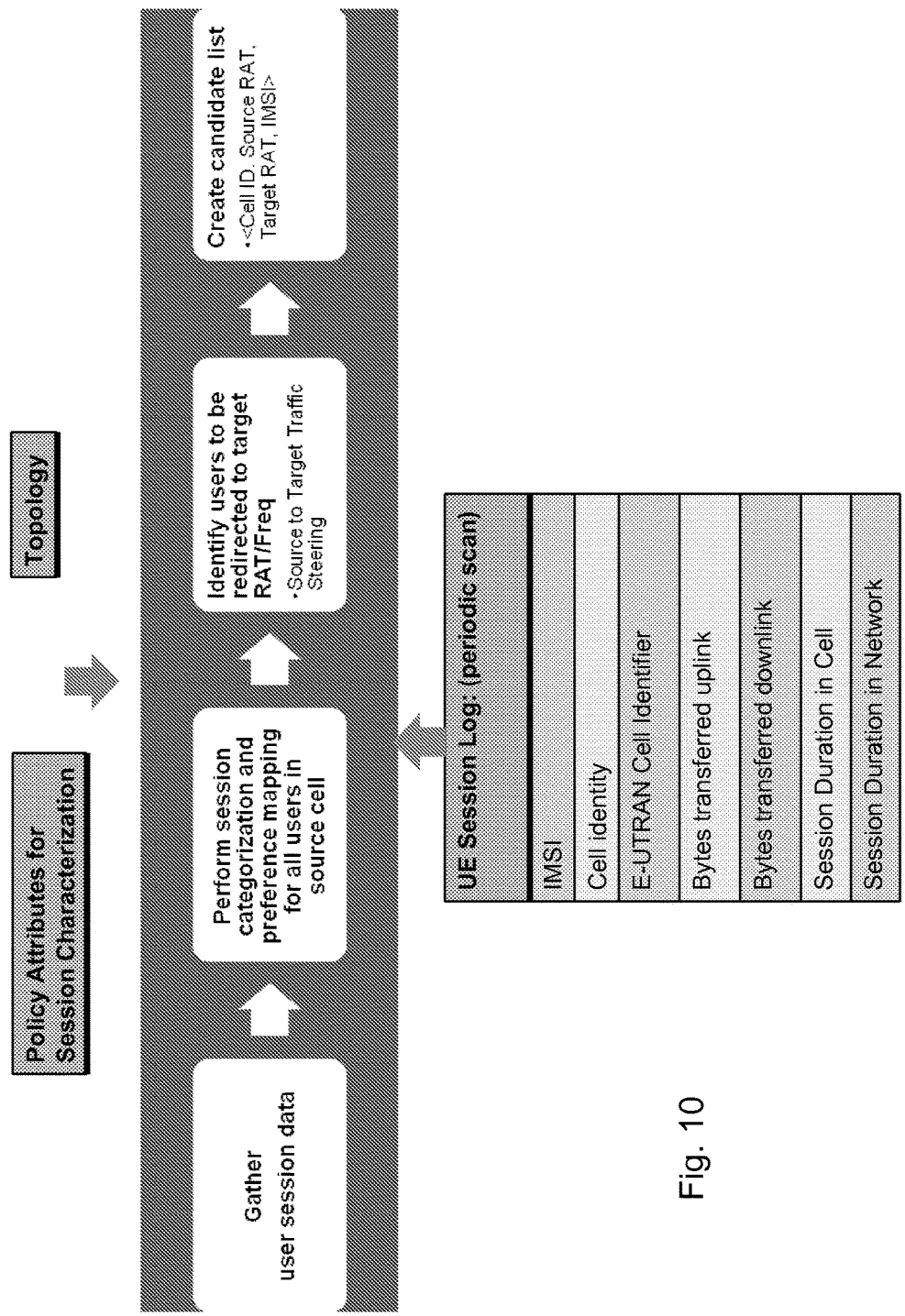
FIG. 10 illustrates an applied policy of FIG. 4 in more details.

FIGS. 7 to FIG. 10 illustrate an applied policy of FIG. 4 in more details. FIG. 7 illustrates the load distribution policy, FIG. 8 illustrates the subscriber prioritization policy, FIG. 9 illustrates the application mapping policy and FIG. 10 illustrates the session characterization policy. By applying a policy a periodic scan in an UE session is performed and parameters, such as IMSI, cell identity, bytes transferred uplink, bytes transferred downlink are observed and utilized for further steering mechanisms. All applications of a policy aim in a creation of a candidate list comprising for example a cell ID, a source Cell ID, a target RAT and IMSI.

Figure 11:
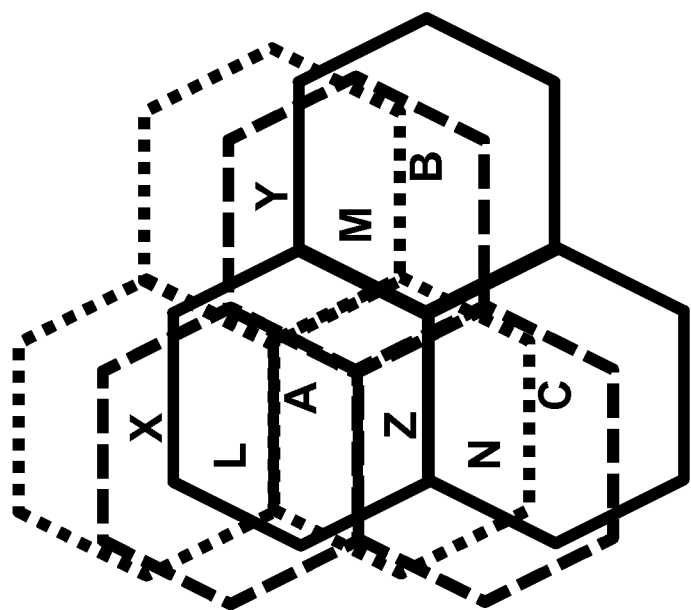
FIG. 11 illustrates an exemplary embodiment of a multiple band matrix.

FIG. 11 illustrates an exemplary embodiment of a multiple band matrix or a multiple band network. In this example the operators network comprises of an UMTS band, a first LTE band and a second LTE band as three technology layers. FIG. 12 shows a table with one column of the scanned cell of the matrix, one column of a target RAT (tRAT) and one column of one or more target cells (tcells) within the target RAT. The table in FIG. 12 shows which of the second LTE cells and UMTS cells overlay with each of the first LTE band cells. In addition, the table in FIG. 12 shows which of the first LTE cells and UMTS cells overlay with each of the second LTE band cells. Although not shown for breviary, the table in FIG. 12 may expanded to show which of the first LTE cells and second LTE band cells overlay with each of the UMTS cells.

Figure 13:
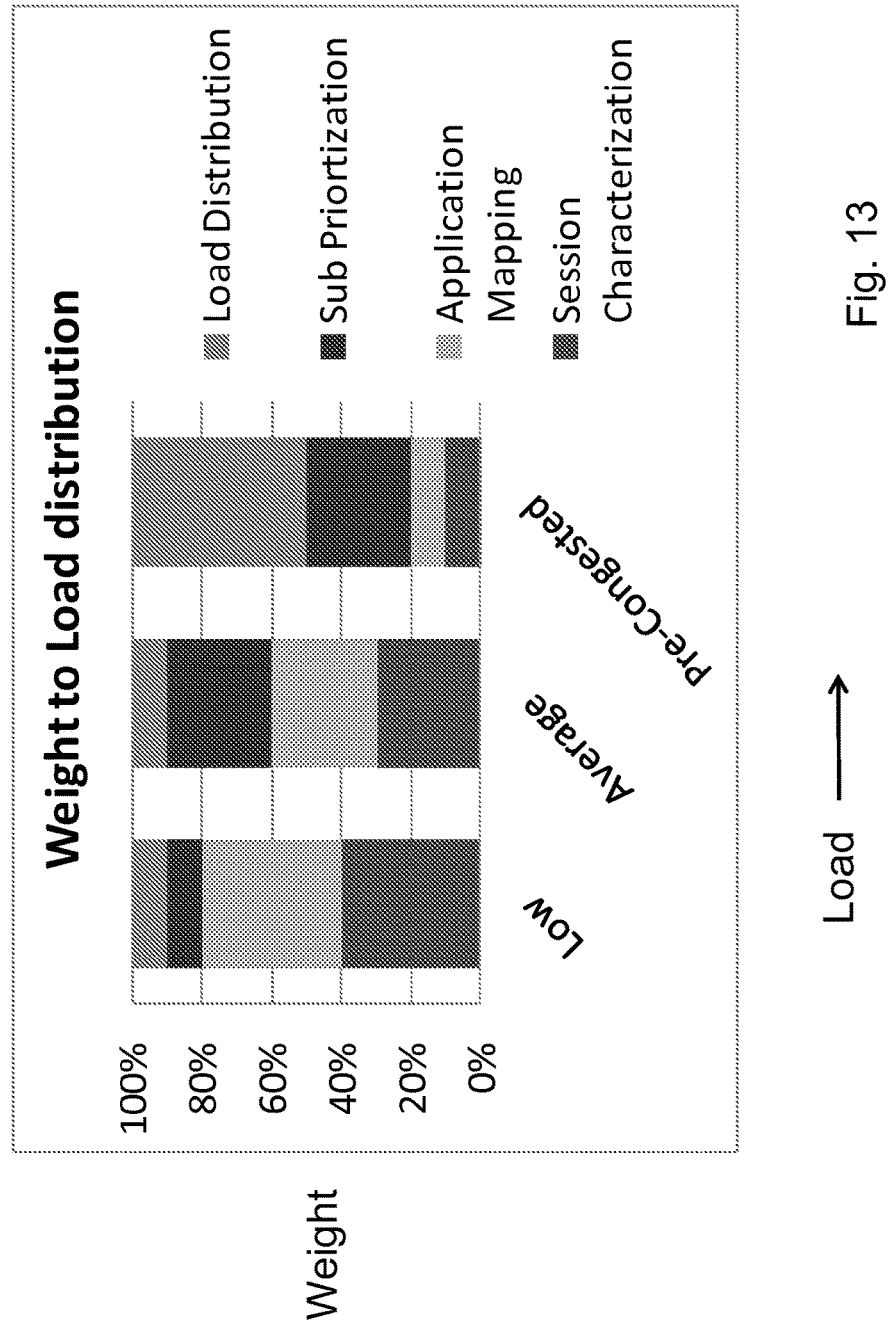
FIG. 13 illustrates an exemplary embodiment of a weighting of different policies.

FIG. 13 illustrates an exemplary embodiment of a weighting of different policies in order to prepare a decision to move one or more terminals or candidates to another technology layer.

Figure 14:
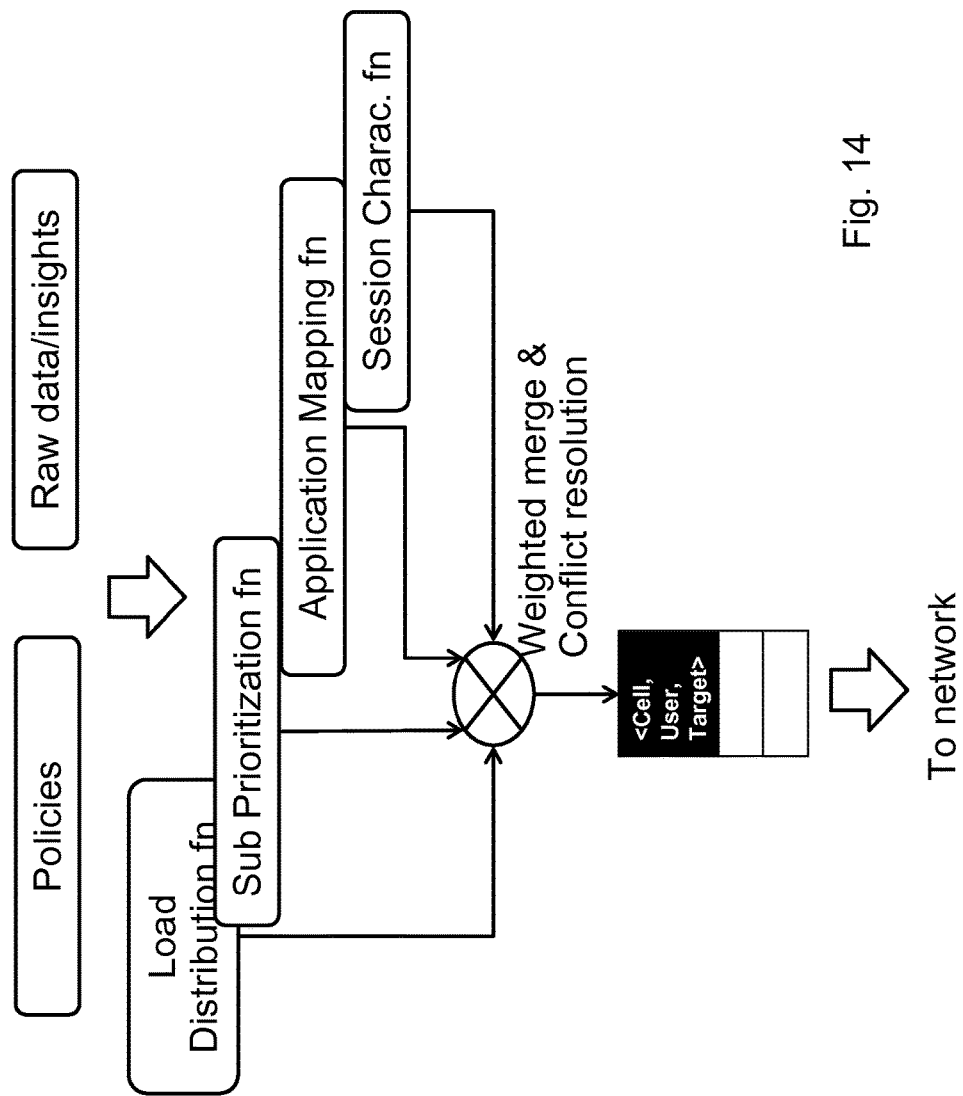
FIG. 14 illustrates an exemplary method how to merge the policies with weighted information.

FIG. 14 illustrates an exemplary method how to merge the policies with weighted information such as of FIG. 12. A load distribution function (fn), a sub prioritization function, an application mapping function and a session characteristic function are merged in order to generate a list with one or more candidates in order to move that one or more candidate to another technology layer within the network. The candidate list is provided to the network in order to prepare measures to move the selected one or more candidates.

FIG. 15 to FIG. 20 show exemplary embodiments of tables which represent parameters for providing to the network in order to prepare traffic steering.

FIG. 15 illustrates policy attributes for the policy of load distribution and a value in relation to the specific attributes. FIG. 16 illustrates an example of workflow configuration comprising different policy workflow configurations with different weight factors from zero to 5.

A goal of the load distribution candidate selection may aim in spreading load evenly across multiple RAT/Frequencies to optimize response time and minimize interference for improved QoE. Therefore it may be provided sorting the source cell UEs by bandwidth utilization into two separate list for uplink (UL) and downlink (DL) utilization. Moreover the traffic steering mechanism may be of unidirectional characteristic. It may only consider moving traffic from the more congested source cell to the lower congested target cell, for example on a different RAT/Frequency. Moreover, the opposite direction may be considered when overlay cells are checked.

Furthermore calculating the amount of UL and DL bandwidth to off-load from the source cell including the potential impact of the identified candidates may be provided.

Therefore the target range defined in the policy configuration may be utilized. Furthermore it may be foreseen using sorted list and identifying the candidates with the highest utilization that improves balance in both UL and DL. Moreover, it may be foreseen storing candidates in the cell candidate list with the priority set as defined in the policy.

FIG. 17 illustrates an exemplary embodiment for a subscriber prioritization candidate selection. The goal using the policy of subscriber prioritization may be to ensure that higher priority class users get desired QoE across all QoS and moreover to capture best QoE for one or more regular users. Therefore, each UE may be identified into a single Subscriber Category (SubCat). Furthermore, the source cell preference and target cell preference may be defined in a configurable Subscriber Mapping Preference Map, such as for example shown in FIG. 17. The table may map subscribers into a range from High Value Customers (HVCs) to Low Value Customers (LVCs) Categories by mapping their preferred RAT/Freq based on perceived value. In addition, the UE's Subscriber Category (SubCat) Priority may be computed by using the UE's Source Cell and Target Cell preference values in the Subscriber Mapping Preference Map.

FIG. 18 illustrates an exemplary embodiment for an application mapping for selecting a candidate. The mapping aims in order to ensure applications use the appropriate RAT as defined by Network Service Provider, e.g. voice/text on UMTS layer and video/P2P/FTP on LTE layer.

The source cell and target cell preference may be defined in the configurable Application Mapping Preference Map as shown in the table of FIG. 18. The UE's Application (App) priority may be computed by using the UE's Source Cell and Target Cell preference values in the Application Mapping Preference Map.

The higher the number in FIG. 18 the more the RAT/Frequency is preferred. In the implementation, the number is only provided and used. This example comprises a short word to describe the preference and is considered just as a comment. The range may be larger than 1 to 4, and if desired can include both zero and negative numbers. The numbers need not be unique across either a row or a column.

FIG. 19 illustrates an exemplary embodiment of a table for a session characterization policy and FIG. 20 illustrates an exemplary a session category preference map.

The session characterization policy as shown in FIG. 19 aims to ensure that users are on the appropriate RAT as defined by a Network Service Provider based on session characteristics by mapping their preferred RAT/Freq based on the session characterization. This may be performed by mobility determined by the (configurable) duration of the session in a single cell. It may be selected between high velocity, low velocity and stationary. A High Velocity may be chosen when a session is long, but the UE has only been in a cell for a short period. A Low Velocity may be chosen when a session is in a single cell for a long period of time. Stationary may be chosen when a session is in a single cell for an extended period of time.

The session characterization table in FIG. 20 may be firstly used to assign a session category to the UE. The session category preference map may also be used to identify the preference of the UE's session category for both the source RAT and target RAT.

There may be several considerations available to be used for moving a user from one technology layer to another technology layer. Exemplary possible triggers are provided in FIG. 21. A trigger may be provided by information of a subscriber, by geographical information, by network optimization information, by overlay network architecture and/or by a network impact. It may be possible to move a single user according to such a trigger information. Moreover it may be possible to move a group of users having one or more identical parameters, such as utilizing the same mobile model, utilizing a tablet computer device or a tablet PC, etc.

Figure 22:
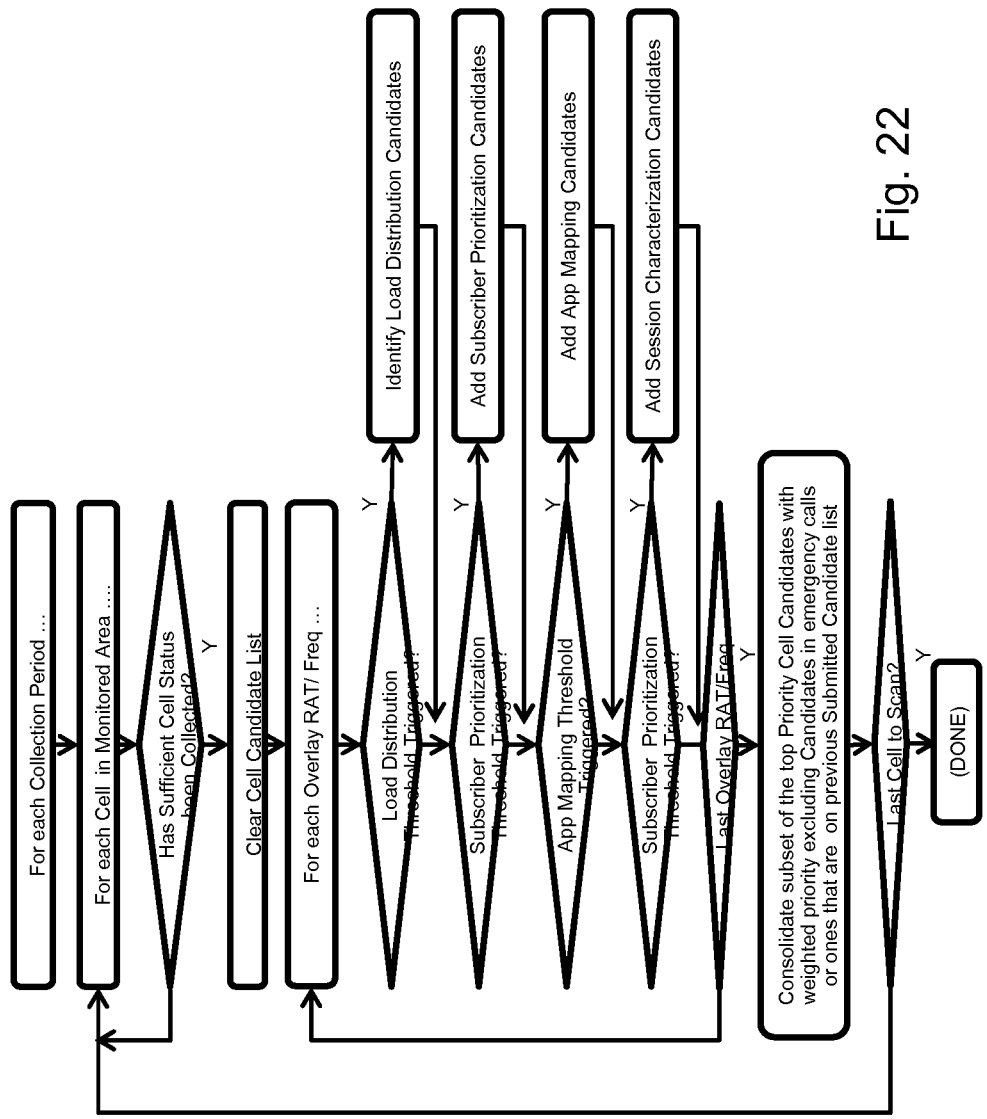
FIG. 22 illustrates an exemplary embodiment of a traffic steering mechanism.
Figure 23:
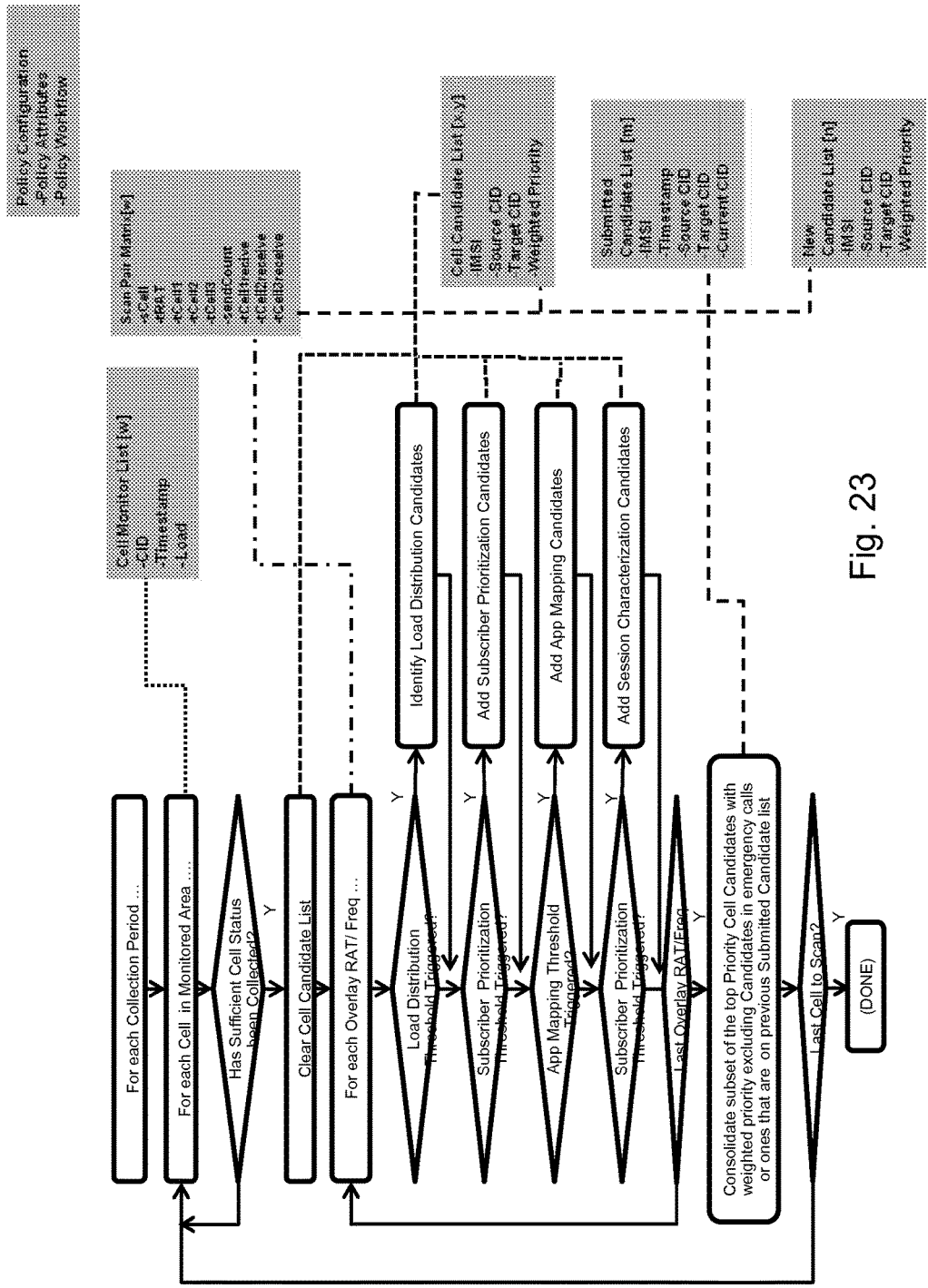
FIG. 23 illustrates the exemplary embodiment of FIG. 23 comprising more details.

FIG. 22 and FIG. 23 illustrate exemplary embodiments a traffic steering mechanism, respectively, whereas FIG. 23 shows further details of data information utilized in different boxes of the flow diagram illustrated in FIG. 22.

FIG. 22 is a logic flow diagram illustrating the operation of a method, and a result of execution of computer program instructions embodied on a computer readable memory, for operating an apparatus according to an example embodiment of these teachings.

The logic in FIG. 22 may be performed by the insight based traffic steering element as shown in FIG. 2 and as defined in a computer program code and may be executed by the one or more processors of the insight based traffic steering element.

If desired, the different functions and illustrated blocks discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

LIST OF ABBREVIATIONS

The following abbreviations that may be found in the specification and/or the drawing figures are defined as follows:
3GPP Third Generation Partnership Project
BSS Base Station System
BW Bandwidth
C-CEI Cell-Customer Experience Index
CEI Customer Experience Index
CEM Customer Experience Management
CID Cell Identification
CSP Communication Service Provider
DL Downlink
DPI Deep Packet Inspection
E2E End to End
EvDo Evolution Data Only
eNB or eNode B evolved Node B (e.g., LTE base station)
fn Function
G Generation (e.g., 2.5G, 3G, 4G)
HVC High Value Customer
KPI Key Performance Indicator
LTE Long Term Evolution
LVC Low Value Customer
MLB Mobility Load Balancing
MRO Mobility Robustness Optimization
NE Network Element
NMS Network Management System
NOC Network Operations Center
NSN Nokia Siemens Networks
OSS Operational Support System
PCEF Policy and Charging Enforcement Function
PCRF Policy and Charging Rule Function
PDF Policy Division Function
PM Performance Management
QoE Quality of Experience
QoS Quality of Service
RAN Radio Access Network
RAT Radio Access Technology
RF Radio Frequency
RNC Radio Network Controller
RSRP Reference Signal Received Power
Rx Receiver or reception
SAI Serve At once Intelligence
SON Self-Organizing Network
UE User Equipment
UL Uplink
UMTS Universal Mobile Telecommunications System (WCDMA)
UTRAN Universal Terrestrial Radio Access Network
VoC Value of Cell
WiFi Wireless Fidelity

The invention claimed is:

1. A method for traffic steering in a communication network comprising at least two technology layers, the method comprising:
    utilizing for traffic steering at least one policy of the group comprising a subscription prioritization policy, an application mapping policy, and a session characterization policy;
    selecting one or more users in a first technology layer according to the at least one policy;
    preparing a movement of one or more selected users to a second technology layer; and
    generating a user list comprising a plurality of users for traffic steering, wherein the user list is generated on a real-time, near real-time, online, or offline basis.

2. The method according to claim 1, further comprising providing information of a user to elements in the network in order to prepare a steering of traffic.

3. The method according to claim 1, wherein utilizing scalable weighted merge of independently generated user lists to generate a final user list.

4. The method according to claim 1, further comprising utilizing network load as a trigger to start and/or stop the generating of the user list.

5. The method according to claim 1, wherein the user list is generated on periodic basis.

6. The method according to claim 1, further comprising utilizing policy thresholds in order to constrain the number of simultaneous traffic steering requests from various policies to avoid an oscillation of traffic.

7. The method according to claim 1, further comprising applying a configurable scalable weight factor to emphasize different policies under different network conditions.

8. An apparatus, comprising:
    one or more processors; and
    one or more memories including computer program code, the one or more memories and the computer program code configured, with the one or more processors, to cause the apparatus to perform:
    utilizing for traffic steering at least one policy of the group comprising a subscription prioritization policy, an application mapping policy, and a session characterization policy;
    selecting one or more users in a first technology layer according to the at least one policy;
    preparing a movement of one or more selected users to a second technology layer; and
    generating a user list comprising a plurality of users for traffic steering, wherein the user list is generated on a real-time, near real-time, online, or offline basis.

9. The apparatus of claim 8, wherein the apparatus is a network element or a terminal.

10. The apparatus of claim 9, wherein the network element is a traffic steering element, a network node, a server or a policy server.

11. The apparatus of claim 9, wherein the terminal is a mobile phone or a tablet device.

12. The apparatus according to claim 8, wherein the apparatus is configured for receiving trigger information triggering a traffic steering mechanism.

13. A computer program product comprising a non-transitory computer-readable storage medium bearing computer program code embodied therein for use with an apparatus, the computer program code comprising:
    code for utilizing for traffic steering at least one policy of the group comprising a subscription prioritization policy, an application mapping policy, and a session characterization policy;
    code for selecting one or more users in a first technology layer according to the at least one policy;
    code for preparing a movement of one or more selected users to a second technology layer; and
    code for generating a user list comprising a plurality of users for traffic steering, wherein the user list is generated on a real-time, near real-time, online, or offline basis.

* * * * *